United States Patent [19]
Takamiya et al.

[11] Patent Number: 5,229,757
[45] Date of Patent: Jul. 20, 1993

[54] COMPUTER DEVICE HAVING DETACHABLE KEYBOARD MOUNTED ON A ROTATABLE DISPLAY

[75] Inventors: Kuniomi Takamiya, Kitakatsuragi; Nobuhiko Miyazaki, Yao; Hideo Oda, Higashi-Osaka; Takuzi Inoue, Sakurai, all of Japan

[73] Assignee: Sharp Kabushiki Kaisha, Osaka, Japan

[21] Appl. No.: 595,568

[22] Filed: Oct. 11, 1990

[30] Foreign Application Priority Data

Oct. 18, 1989 [JP] Japan .............. 1-121971[U]
Oct. 18, 1989 [JP] Japan .............. 1-121972[U]
Oct. 18, 1989 [JP] Japan .............. 1-121973[U]
Oct. 18, 1989 [JP] Japan .............. 1-121974[U]
Oct. 18, 1989 [JP] Japan .............. 1-121975[U]

[51] Int. Cl.$^5$ .............................. G09G 1/28
[52] U.S. Cl. ................... 340/711; 364/708; 235/145 R
[58] Field of Search ........... 340/700, 706, 711; 400/682, 685, 691, 693, 680, 681; 248/916, 917, 918; 235/145 R; 361/380, 393; 292/83, 163, 175; 341/22; 364/708, 710; 312/208; 434/432

[56] References Cited

U.S. PATENT DOCUMENTS

| 3,671,065 | 6/1972 | Bingham | 292/175 |
| 4,704,604 | 11/1987 | Fuhs | 340/711 |
| 4,960,256 | 10/1990 | Chihara et al. | 248/917 |
| 4,980,676 | 12/1990 | Nomura et al. | 340/700 |
| 4,980,848 | 12/1990 | Griffin et al. | 364/708 |

FOREIGN PATENT DOCUMENTS

| 0273750 | 12/1987 | European Pat. Off. . | |
| 60-158228 | 10/1985 | Japan . | |
| 63-39734 | 3/1988 | Japan . | |
| 8402025 | 5/1984 | PCT Int'l Appl. | 340/711 |
| 2175749A | 4/1986 | United Kingdom . | |
| 2200783A | 1/1988 | United Kingdom . | |

*Primary Examiner*—Alvin E. Oberley
*Assistant Examiner*—Chanh Nguyen
*Attorney, Agent, or Firm*—Nixon & Vanderhye

[57] ABSTRACT

A computer device with a display comprising a body, a display rotatably mounted on the body and a keyboard having input keys, wherein the keyboard is removably mounted on the display so as to cover an opening with the surface thereof turned toward the display, the keyboard having a size enough to cover the opening of the display and having a projection for attaching the keyboard to the display formed in an edge on the display side and a keyboard locking projection which can advance from and retreat into the surface of the keyboard formed in an edge on an operator's side, the display having a lower keyboard receiving face provided below the opening, an upper keyboard receiving face provided above the opening and a keyboard contact portion provided on a peripheral edge of the opening, and the lower keyboard receiving face having a hole into which the projection can be inserted and which can rotate the keyboard with the projection inserted thereinto and the upper keyboard receiving face having a hole which can be engaged with the advancing keyboard locking projection.

6 Claims, 14 Drawing Sheets

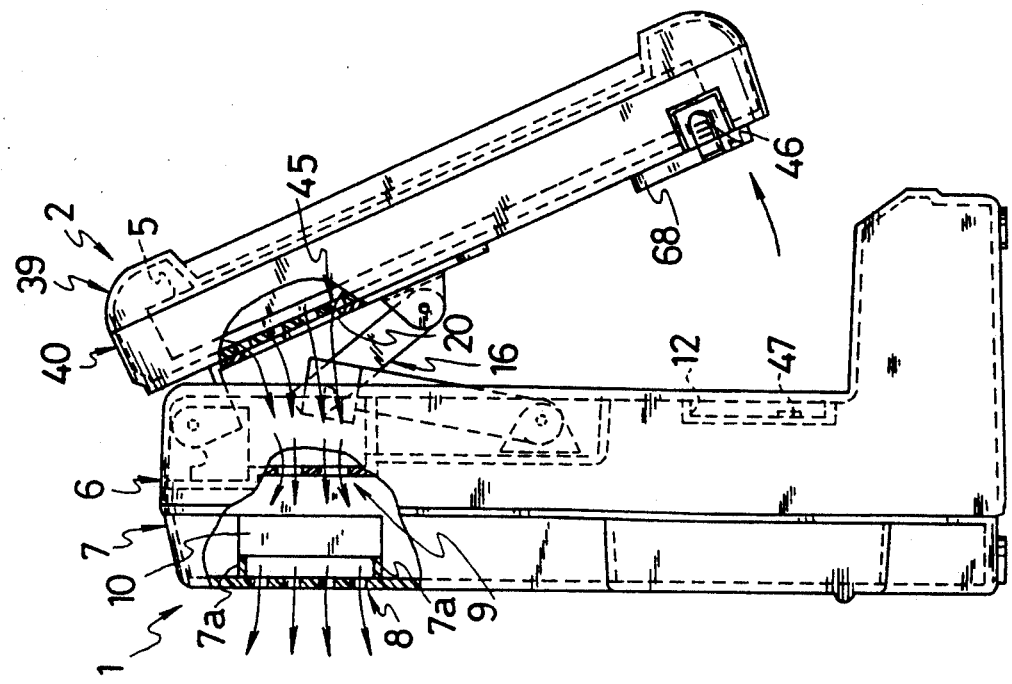
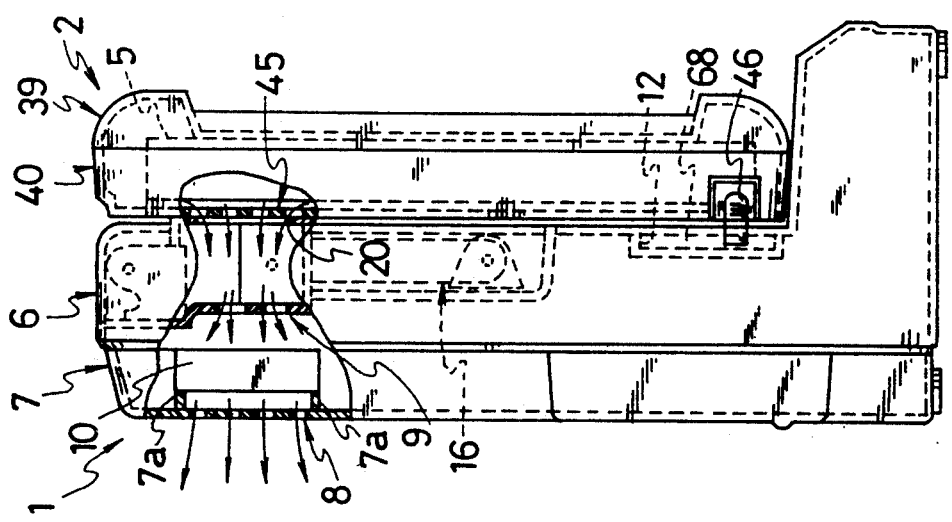

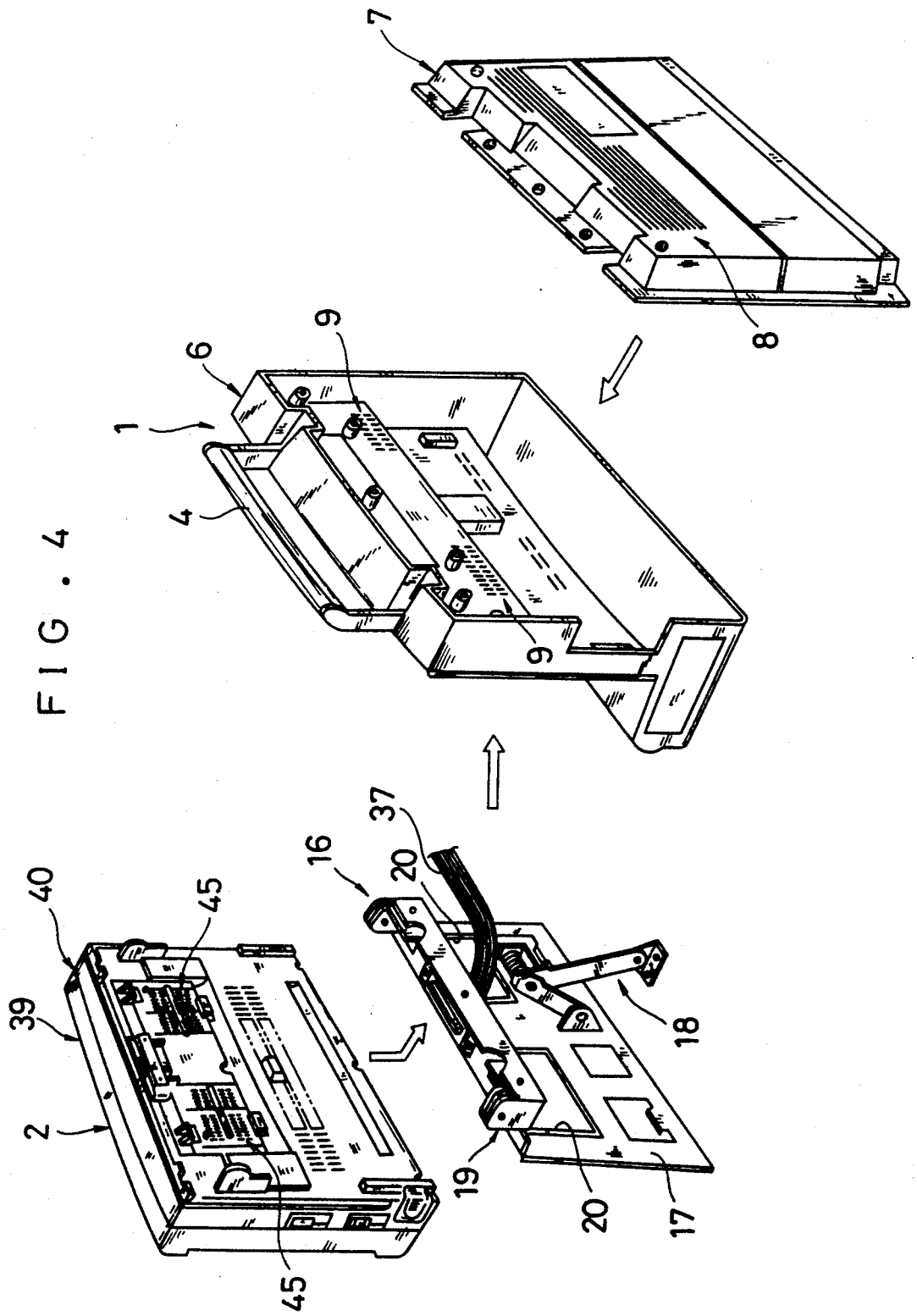

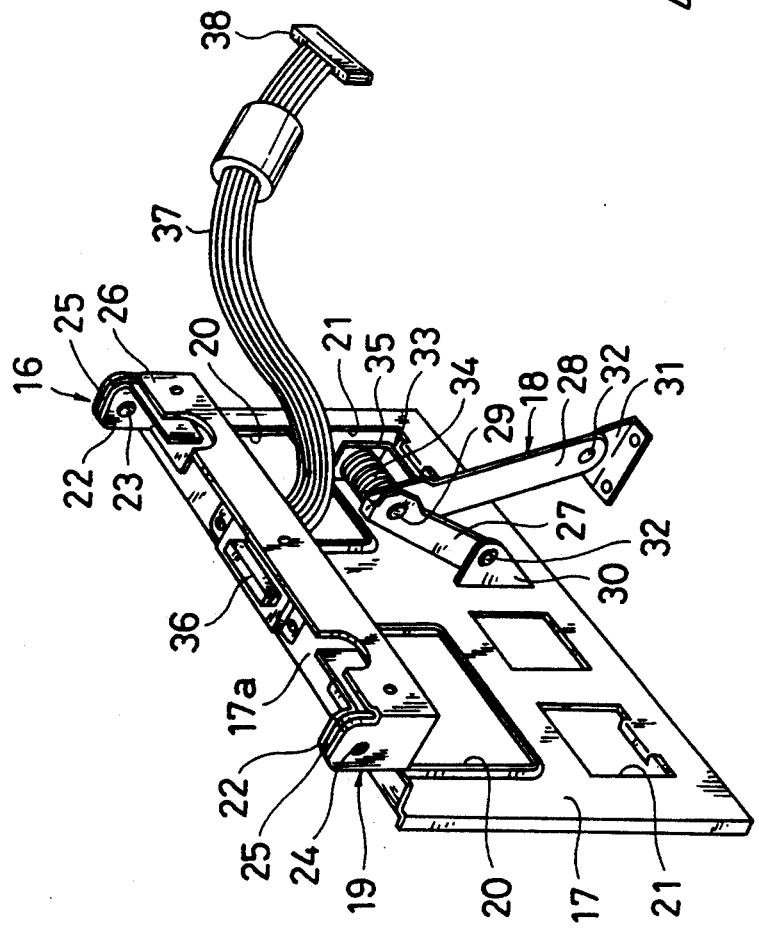

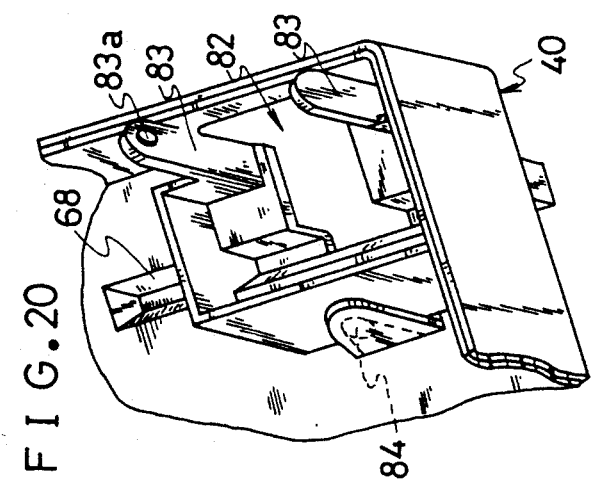
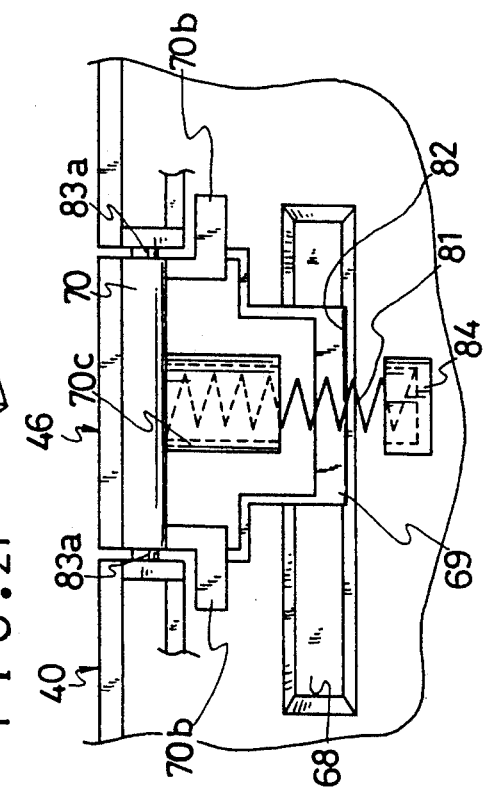
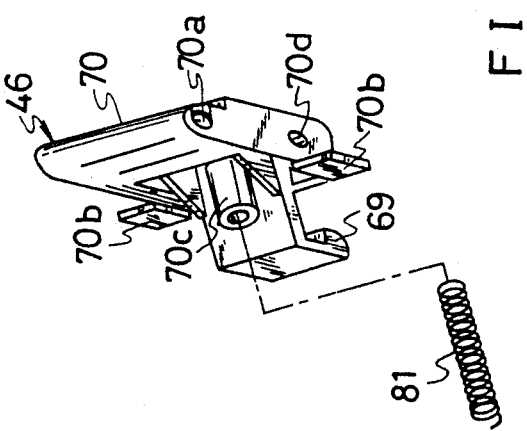
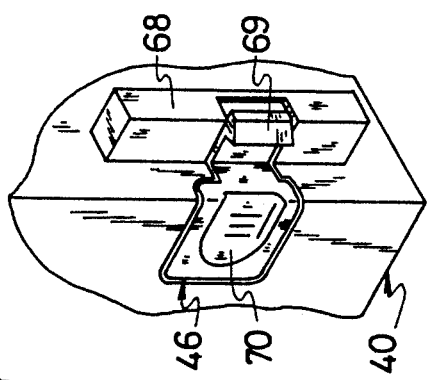
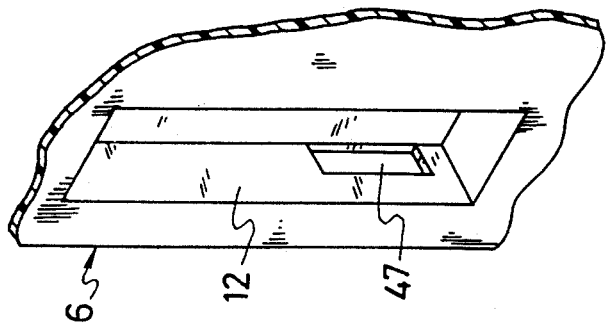

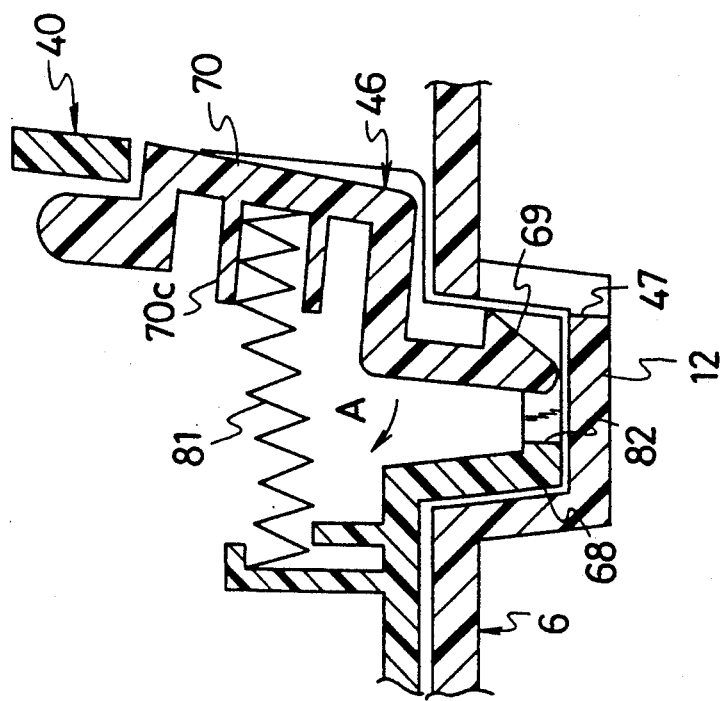
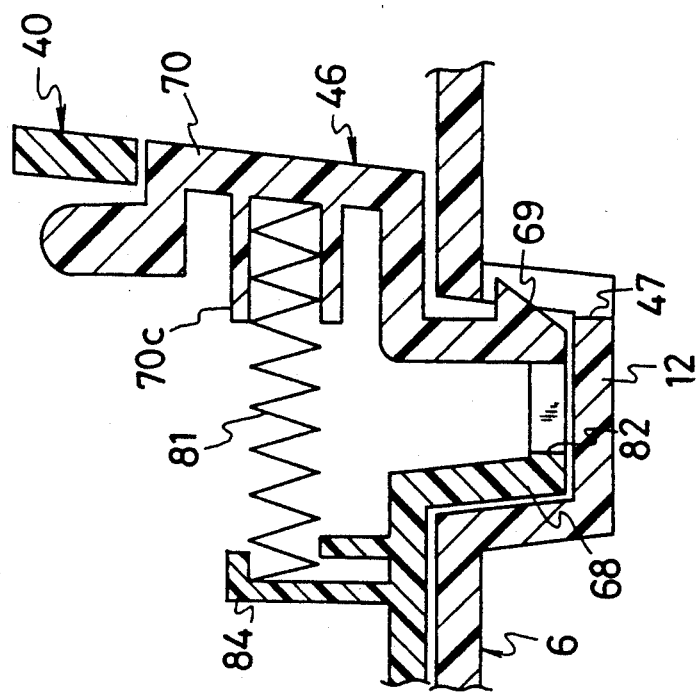

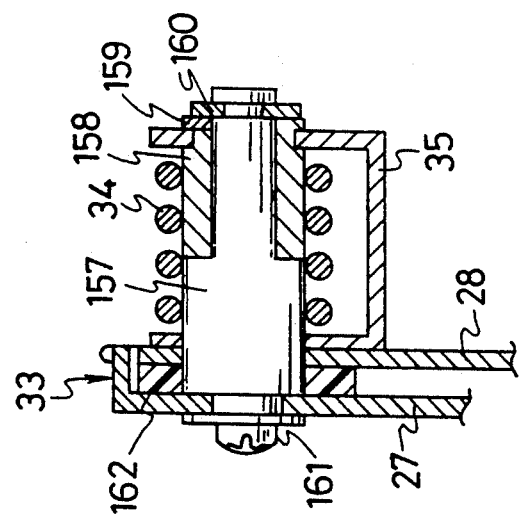
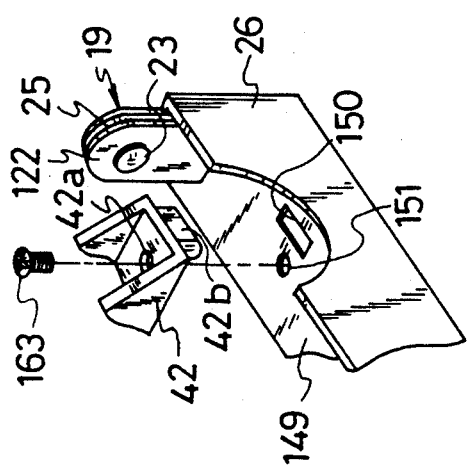
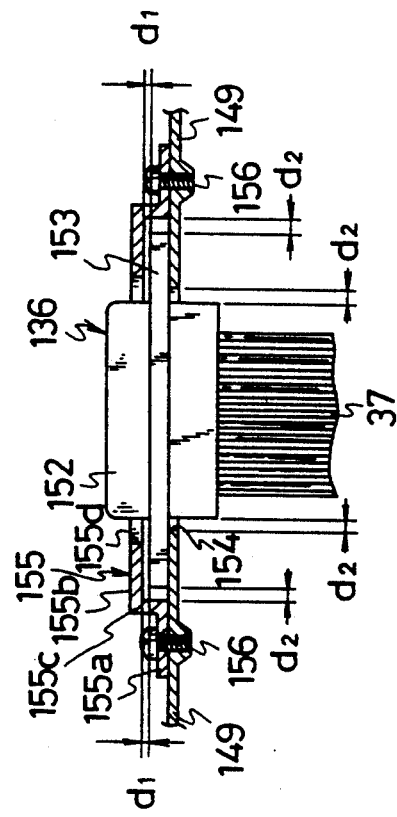

COMPUTER DEVICE HAVING DETACHABLE KEYBOARD MOUNTED ON A ROTATABLE DISPLAY

BACKGROUND OF THE INVENTION

1. Field of the Invention

The present invention relates to a computer device with a display in which the display is rotatably provided on the front side of a body and a keyboard as an input portion can be attached to the display.

2. Description of the Prior Art

Conventionally, a computer device such as a personal computer, a word processor or the like comprises a keyboard as an input portion, a body having an electric power unit, a circuit board and the like and a display having a display unit. In order to ensure a good operation, the small-sized and portable computer device with a display can be rotated against the body so that the display may optionally set an angle of inclination.

For example, U.S. Pat. No. 4,852,032 discloses this type of computer device with a display wherein the display can be housed in a cabinet of the body and the keyboard can removably be mounted on the body with the surface thereof turned toward the body. In a case in which the keyboard is attached to the body, a projection of the keyboard formed on an end face toward the body is caused to be engaged with a concave formed on a protrusion in a lower portion of the body so that the keyboard is rotated in a direction of the body. Then, a stop lever which is projected onto an upper portion of the body and energized in a direction of stop by a spring is caused to be inserted into a long groove formed on the keyboard so as to be engaged with an end of the long groove.

According to the computer device with a display described above, however, the keyboard can be housed in the body only after the display is housed in the body. In addition, the display can be rotated only after the keyboard is removed. Therefore, the order of the operations is limited so that the operations are troublesome. Furthermore, if the keyboard is being attached to the body without the display housed fully in the body, a screen of the display collides with the keyboard. Consequently, there is a possibility that the display and the keyboard are damaged.

In the computer device with a display described above, the keyboard covers an opening of the body in which the display is housed. Consequently, if the computer device includes the display having a display unit of which screen is large-sized, the keyboard may not cover the opening fully. On the other hand, if the keyboard is formed so as to cover the opening fully, it is large-sized and hard to use.

Furthermore, a locking mechanism for attaching the keyboard to the body is not a unit type. Therefore, the operation of incorporating the locking mechanism into the body is complicated. The locking mechanism locks the keyboard to the body through the stop lever energized by the spring. Consequently, there is a possibility that the stop lever is disengaged by external shock so that the keyboard is fallen down and damaged at the time of carrying the computer device. In addition, the stop lever is protruded from the body. Therefore, there is a problem that the stop lever may catch clothes or the like during the operation.

SUMMARY OF THE INVENTION

It is an object of the present invention to provide a computer device with a display comprising a body, a display rotatably mounted on the body and a keyboard having input keys, wherein the keyboard is removably mounted on the display so as to cover an opening with the surface thereof turned toward the display, the keyboard having a size enough to cover the opening of the display and having a projection for attaching the keyboard to the display formed in an edge on the display side and a keyboard locking projection which can advance from and retreat into the surface of the keyboard formed in an edge on an operator's side, the display having a lower keyboard receiving face provided below the opening, an upper keyboard receiving face provided above the opening and a keyboard contact portion provided on a peripheral edge of the opening, and the lower keyboard receiving face having a hole into which the projection can be inserted and which can rotate the keyboard with the projection inserted thereinto and the upper keyboard receiving face having a hole which can be engaged with the advancing keyboard locking projection.

According to the above construction, even if the display has a display unit of which screen is large-sized, it is sufficient that the keyboard has a size enough to cover the opening of the display fully. Consequently, it is not required to enlarge the keyboard. In addition, there is no inconvenience that the keyboard is hard to use.

In a case in which the keyboard is attached to the display, the projection of the keyboard is inserted into the hole formed on the lower keyboard receiving face of the display so that the keyboard is rotated in the direction of the body with the surface of the keyboard turned toward the display. Then, a tip portion of the keyboard locking projection advances from the surface of the keyboard with the keyboard coming into contact with the keyboard contact portion of the display. Consequently, the tip portion of the keyboard locking projection is engaged with the hole formed on the upper keyboard receiving face of the display so that the keyboard is attached to the display. Whether the display is inclined to the display or not, the above operation can be performed. In a case in which the keyboard is removed from the display, an operation reverse to the above operation is performed.

According to the computer device of the present invention, the keyboard can be attached to the display irrespective of a state of inclination thereof. Consequently, the order of the operations can be changed more freely and the keyboard can easily be attached to or removed from the display. Furthermore, when the keyboard is attached to or removed from the display, the display or keyboard is rarely damaged.

It is preferred that the present invention has a construction wherein vents formed in the back of a rotatable display cooperate with a fan in the base computer unit to rool the display. In the computer device with a display, the display further has vents formed on the back side thereof, the body further has vents formed on the front and back sides thereof respectively and has cooling fans for sending air in a direction of a vent on the back side thereof provided therein.

According to the above construction, if the computer device is operated, cooling fans are operated so that hot air produced by heat generation of an electric power unit and a circuit board in the body is discharged from a vent on the back side of the body. At the same time, air is absorbed through vents on the front side of the body so that the air flow toward the inside of the body is generated on the front side of the vent. Consequently, the hot air produced by the heat generation of the display unit is discharged from the vents on the back side of the display so that the inside of the body and display is cooled.

In consideration of another point of view, one of the display and the body has a projection and the other has a concave, the projection being engaged with the concave so that the rotation of the display is controlled and the display is fixed to the body, and one of the display and the body has an engagement guide projection and the other has an engagement guide concave into which the projection can be fitted when the projection is engaged with the concave.

According to the above construction, in a case in which a projection is engaged with a concave, an engagement guide projection formed on one of the display and body is fitted into an engagement guide concave formed on the other. Accordingly, since it is hard to shift the positions of the projection and the concave at the time of engagement, the operation of engagement can easily be performed. In addition, the projection is rarely damaged at the time of engagement. Furthermore, the engagement guide projection and concave can get external shock with the projection engaged with the concave. Accordingly, shock resistance can be enhanced and the display can be prevented from being vibrated. In addition, the above function can be obtained without enlarging the projection. Consequently, there is no inconvenience that the projection is obstructive.

In consideration of a further point of view, the body has a tilt unit for rotatably supporting the display on an upper portion thereof formed on a front face thereof, the tilt unit having a display receiving member, a hinge portion provided on an upper end of the display receiving member for rotatably connecting the display receiving member to the body and a rotary support unit provided between the body and a position remote from the hinge portion of the display receiving member to a rotary end side opposite to the hinge portion side for holding the display to have an optional angle of inclination, the display being removably attached to the display receiving member.

According to the above construction, a tilt unit includes a display receiving member, a hinge portion for rotatably connecting the display receiving member to the body and a rotary support unit for holding the display to have an optional angle of inclination. The display is removably attached to the display receiving member. Accordingly, the display can easily be attached to or removed from the display receiving member by the external operation. At the same time, the display can be designed more freely. In addition, goods can easily be developed, for example, the grade of the display can easily be changed from a monochrome type to a color type.

In consideration of a further point of view, the computer device further comprises a key cord for connecting the keyboard to the body, the key cord having one end thereof directly connected to the keyboard and the other end thereof connected to the body through a connector, and the keyboard having a cord housing for housing the key cord.

According to the above construction, in a case in which the keyboard is housed with being attached to the display, a key cord is removed from the body so as to be housed in a cord housing formed on the keyboard. In this case, the key cord has one end thereof directly connected to the keyboard and the other end thereof connected to the body through a connector. Therefore, it is sufficient that the end of the key cord is disconnected from the body. Consequently, the operation can easily be performed. Also in a case in which the keyboard is connected to the body, an operation reverse to the above operation can easily be performed.

The keyboard has a larger space than the body. Consequently, the cord housing of the keyboard can have a relatively large size. Accordingly, the key cord can easily be housed in or taken out of the cord housing. In addition, one end of the key cord is always connected to the keyboard. Therefore, there is no possibility that the key cord is lost. Furthermore, in a case in which the keyboard is used, the key cord is always near at hand.

BRIEF DESCRIPTION OF THE DRAWINGS

FIGS. 1 to 16, 27 and 28 are views showing one embodiment of the present invention.

FIG. 1 is a perspective view showing a state in which a computer device with a display is used;

FIG. 2 is a perspective view showing a state in which the computer device with a display is housed;

FIG. 3(a) is a schematic side view showing a state in which the display is locked into a body;

FIG. 3(a) is a schematic side view showing a state in which the display is rotated upward;

FIG. 4 is a schematic exploded perspective view showing the body and the display of the computer device with a display;

FIG. 5 is a perspective view of the body seen from the front side thereof;

FIG. 6(a) is a perspective view of a front body cabinet seen from the back side thereof;

FIG. 6(b) is a perspective view of a body back cabinet seen from the back side thereof;

FIG. 7 is a perspective view of a tilt unit seen from the back side thereof;

FIG. 8 is a perspective view of the display seen from the back side thereof;

FIG. 9 is an exploded perspective view showing a keyboard;

FIG. 10 is a perspective view of a main portion showing an upper housing of the keyboard;

FIG. 11 is a perspective view showing a main portion of a lower housing of the keyboard;

FIG. 12 is a perspective view showing a keyboard locking member;

FIG. 13 is a front view showing the keyboard locking member mounted on a receiving member;

FIG. 17 is an enlarged perspective view of a locking guide concave shown in FIG. 5;

FIG. 18 is an enlarged perspective view showing a construction in the vicinity of a display locking member in FIG. 8;

FIG. 19 is an exploded perspective view showing the display locking member and a compression spring;

FIG. 20 is a perspective view showing a construction in the vicinity of a portion in a display back cabinet on which the display locking member is mounted;

FIG. 21 is a rear view of a main portion of the display back cabinet showing a state in which the display locking member is mounted;

FIG. 22(a) is a schematically lateral section view showing a state in which the display locking member is engaged with a hole;

FIG. 22(b) is a schematically lateral section view showing a state in which the display locking member is disengaged from the hole;

FIGS. 24 to 26 are views showing variants of the tilt unit;

FIG. 24 is a perspective view of the tilt unit seen from the back side thereof;

FIG. 25 is an exploded perspective view showing a state in which the display is attached to and removed from the tilt unit;

FIG. 26 is a longitudinal section view showing a construction in which a female connector is attached to the tilt unit;

FIG. 27 is a longitudinal section view showing a damper unit; and

FIG. 28 is an exploded perspective view showing the upper housing of the keyboard.

DETAILED DESCRIPTION OF THE PREFERRED EMBODIMENTS

Figure 2:
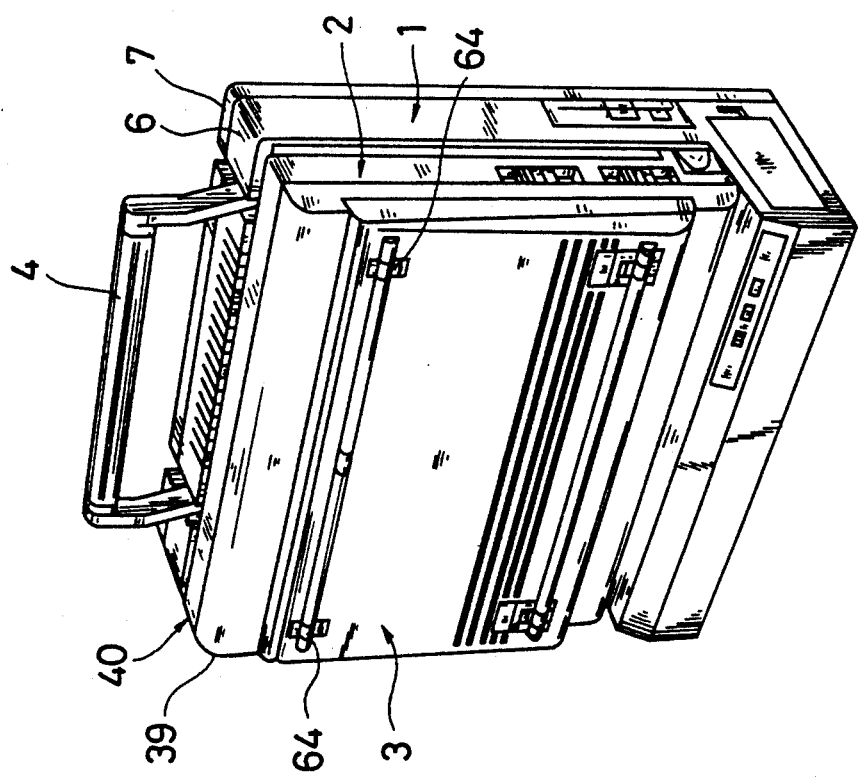

As shown in FIG. 2, a computer device with a display according to the present embodiment is portable and comprises a body 1, a display 2 and a keyboard 3 as an input portion. The body 1 includes a handle 4 which is used when the computer device of the present invention is carried. The handle 4 can be rotated in a direction of the back of the body 1 when the computer device of the present invention is used. As shown in FIGS. 3(a) and (b) and FIG. 4, the display 2 is provided on the front side of the body 1 and connected to the body 1 so that it can be rotated around its upper portion by a tilt unit 16. The keyboard 3 has a size enough to fully cover an opening 71 of the display 2 to be described below and is removably mounted on the display. In addition, the keyboard 3 is adapted to be fixed to the display 2 with the surface thereof turned toward the display 2.

Figure 1:
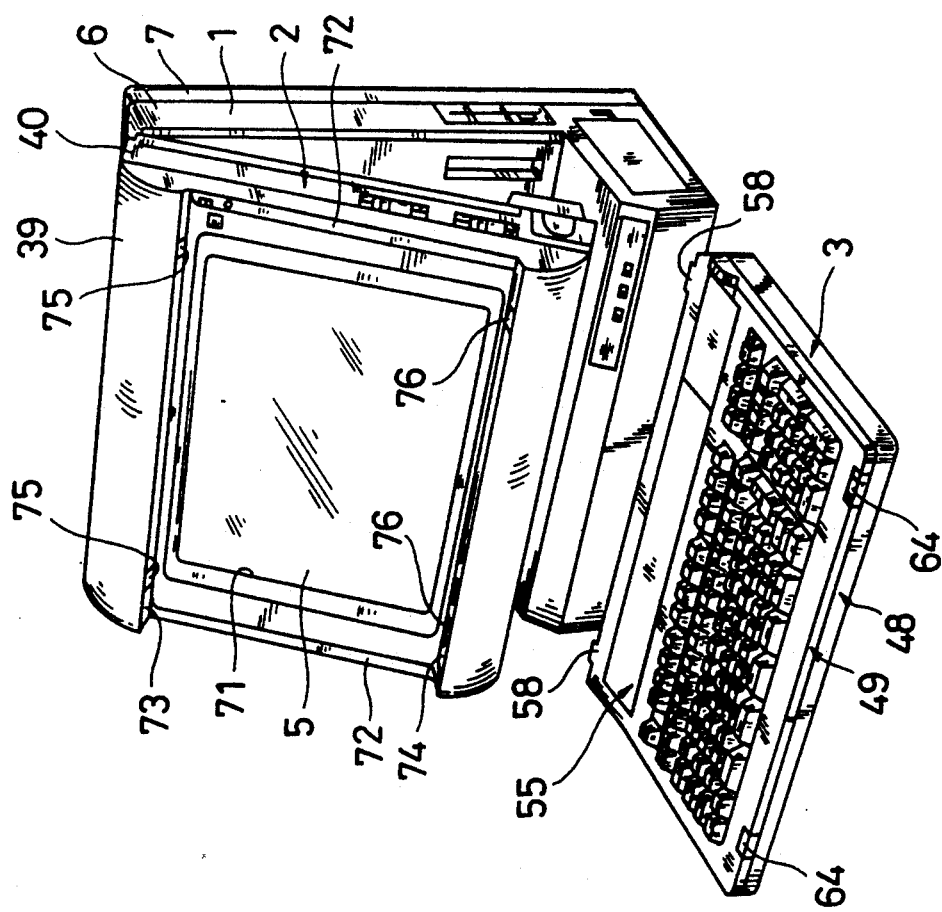

The body 1, the display 2 and the keyboard 3 may be arranged when used as shown in FIG. 1. In other words, the body 1 is arranged with being erected, the keyboard 3 is arranged face up with being removed from the display 2 and the display 2 is rotated to reach an inclined position in which a display unit 5 comprised of a liquid crystal display is easily seen.

Figure 6:
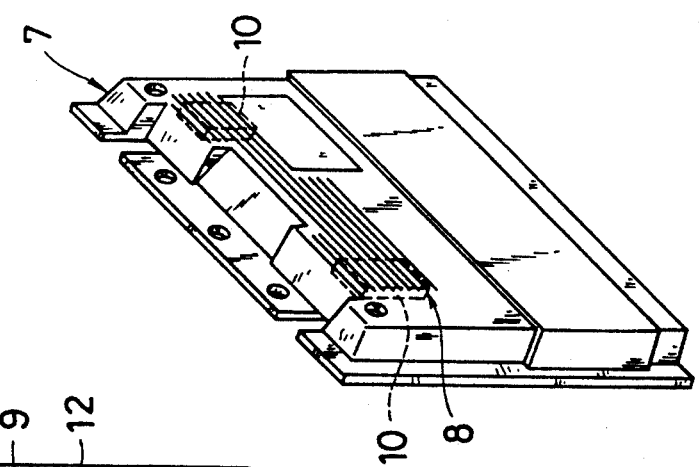
Figure 6:
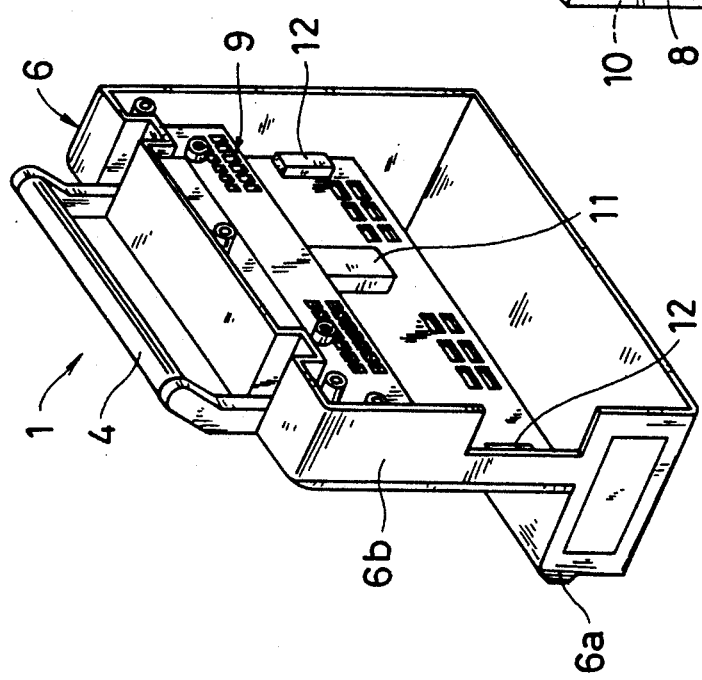
Figure 5:
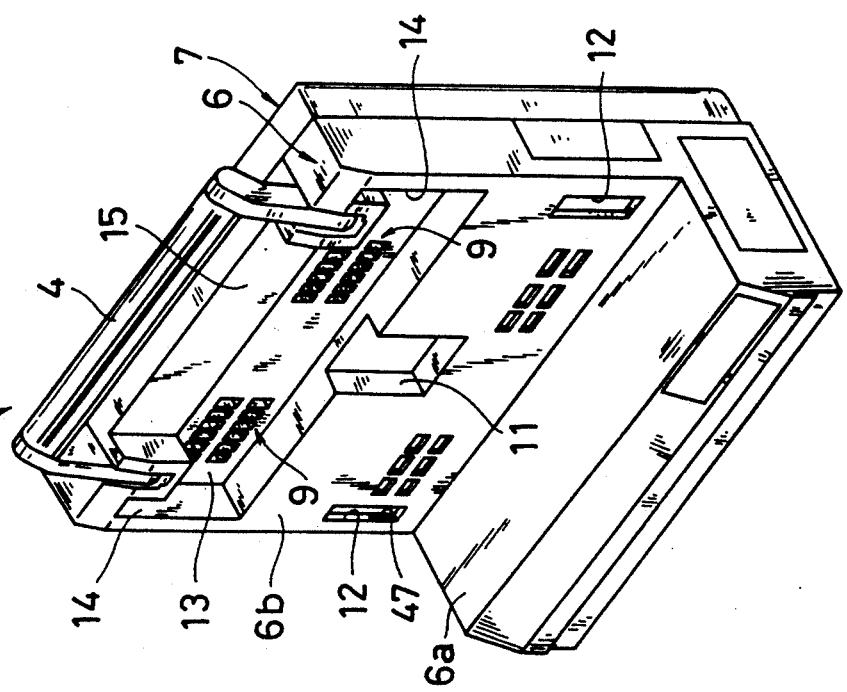

As shown in FIG. 5 and FIGS. 6(a) and (b), the body 1 is a box which comprises a body front cabinet 6 and a body back cabinet 7. The body back cabinet 7 covers the back of the body front cabinet 6. The body front cabinet 6 includes a base 6a forming a bottom of the computer device and an erection 6b extending upward from the base 6a and has a side face thereof approximately L-shaped.

The body back cabinet 7 has a vent 8 extending from side to side formed thereon. The erection 6b of the body front cabinet 6 has vents 9, 9 formed right and left. Cooling fans 10, 10 are provided right and left on an inner surface of the body back cabinet 7 in a position in which the vent 8 is formed. As shown in FIGS. 3(a) and (b), the cooling fans 10, 10 are attached to the body back cabinet 7 through a rib 7a and adapted to send air in a direction of the vent 8.

The erection 6b of the body front cabinet 6 has a concave 11 for mounting a rotary support unit formed in the vicinity of the center on the front face thereof and locking guide concaves 12, 12 as engagement guide concaves which extend upward and downward formed in lower portions in the vicinity of both side edges thereof. The concave 11 has a lateral concave 13 extending from side to side formed thereabove. Also as shown in FIG. 17, the lateral concave 12 has a hole 47 formed on a side wall thereof. The lateral concave 13 has the vents 9, 9 formed right and left. In addition, the concave 13 has rotary guide concaves 14, 14 extending upward therefrom formed on both ends thereof and a concave 15 for mounting the tilt unit formed thereabove.

An electric power unit, a circuit board and the like (not shown) are housed in the box formed by the body front cabinet 6 and the body back cabinet 7. The body back cabinet 7 is screwed to the body front cabinet 6 through the circuit board and the like so that the body 1 is assembled.

As shown in FIG. 7, the tilt unit 16 has a display receiving plate 17 as a display receiving member, a rotary support unit 18 and a hinge portion 19. The display receiving plate 17 has tilt vents 20, 20 formed in positions corresponding to the vents 9, 9 of the body front cabinet 6. The tilt vents 20, 20 have display support openings 21, 21 formed therebelow.

The display receiving plate 17 has a lateral member 17a formed on a top thereof. The lateral member 17a is bent in approximately perpendicular to a lower portion of the display receiving plate 17. The lateral member 17a has hinge rotary members 22, 22 protruded upward formed on both ends thereof. The hinge rotary members 22, 22 are rotatably connected to bent ends of a hinge fixing member 26 through spacers 25, 25. The hinge fixing member 26 extends from side to side on the display receiving plate 17. Each hinge rotary member 22 is connected to the hinge fixing member 26 by means of a connecting pin 23 and a screw 24 which is coupled to the connecting pin 23. The hinge portion 19 comprises the hinge rotary members 22, 22, the connecting pins 23, 23, the screws 24, 24, the spacers 25, 25 and the hinge fixing member 26.

The rotary support unit 18 has two stays 27 and 28 like slender plates. One end of the stay 27 is rotatably connected to that of the stay 28 by means of a connecting pin 29. The other end of the stay 27 is rotatably connected to a bracket 30 fixed to the display receiving plate 17 by means of a connecting pin 32. The other end of the stay 28 is rotatably connected to a bracket 31 fixed to the concave 11 of the body front cabinet 6 by means of the connecting pin 32. A connecting portion of the stays 27 and 28 has a damper unit 33 as an inclination support unit provided therein. The damper unit 33 includes a shaft lock spring 34, a bracket 35 for supporting the shaft lock spring 34, a movable shaft, a rigid shaft and the like (not shown). In addition, the damper unit 33 can hold a state in which the display receiving plate 17, i.e., the display 2 is rotated to have an optional angle of inclination. The shaft lock spring 34 has one end thereof connected to the stay 27 and the other end thereof connected to the bracket 35. The bracket 35 is connected to the stay 28.

The lateral member 17a of the display receiving plate 17 has a female connector 36 provided thereon. The female connector 36 has a cable 37 connected thereto. The cable 37 has a connector 38 provided on a tip thereof. The connector 38 is connected to a connector (not shown) provided on the circuit board in the body 1.

As shown in FIG. 8, the display 2 has a display front cabinet 39 and a display back cabinet 40 as a box. As shown in FIGS. 3(a) and (b), the cabinets 39 and 40 have the display unit 5 provided therein. The display back cabinet 40 has a male connector 41 provided in the center of an upper edge portion on the back thereof. The male connector 41 is fitted into the female connector 36 provided on the display receiving plate 17. In addition, the male connector 41 is connected to the display unit 5 so that the circuit board of the body 1 is connected to the display unit 5.

The male connector 41 has coupling members 42, 42 like protruded pieces formed on both ends thereof. The coupling members 42, 42 are screwed to the lateral member 17a of the display receiving plate 17 in the tilt unit 16. The coupling members 42, 42 have rotary guide projections 44, 44 extending upward and downward provided on the outside thereof. The rotary guide projections 44, 44 are rotatably inserted into the rotary guide concaves 14, 14 of the body front cabinet 6 to help the rotary operation of the display 2.

The coupling members 42, 42 have vents 45, 45 formed in positions corresponding to the tilt vents 20, 20 of the display receiving plate 17 therebelow. The vents 45, 45 have engagement clicks 43, 43 formed therebelow. The engagement clicks 43, 43 are arranged on the lower sides of the display support openings 21, 21 of the display receiving plate 17 so that the display 2 is supported by the display receiving plate 17.

The display back cabinet 40 has display locking members 46, 46 as projected engagement portions provided in the vicinity of lower ends on both sides thereof. Tip portions of the display locking members 46, 46 are protected by locking guide projections 68, 68 formed on the display back cabinet 40. The tip portions of the display locking members 46, 46, i.e., projections 67, 67 to be described below can be engaged with holes 47, 47 as concave engagement portions formed on the locking guide concaves 12, 12 of the body front cabinet 6 shown in FIG. 5. The display 2 is fixed to the body 1 with projections 67, 67 engaged with the holes 47, 47.

As shown in FIG. 1, the display front cabinet 39 has a display opening 71 formed in a position in which the display unit 5 is to be provided. A region in which the display opening 71 is formed is to be concave-shaped so that the keyboard 3 can be provided therein. The display opening 71 has slightly protruded keyboard contact portions 72, 72 formed right and left along both side edges thereof. The keyboard contact portions 72, 72 are formed so as to prevent the keyboard 3 from colliding with the display unit 5 when the keyboard 3 is attached to the display 2. The display opening 71 has upper and lower keyboard receiving faces 73 and 74 opposite to each other formed along upper and lower edges in upper and lower portions thereof.

The upper keyboard receiving face 73 has holes 75, 75 formed in right and left positions thereof. The lower keyboard receiving face 74 has holes 76, 76 formed in right and left positions thereof. The holes 75, 75 are formed so as to insert and fix keyboard locking members 64, 64 of the keyboard 3 to be described below thereinto. The holes 76, 76 are formed such that the projections 58, 58 of the keyboard 3 are inserted thereinto to rotate the keyboard 3.

Figure 9:
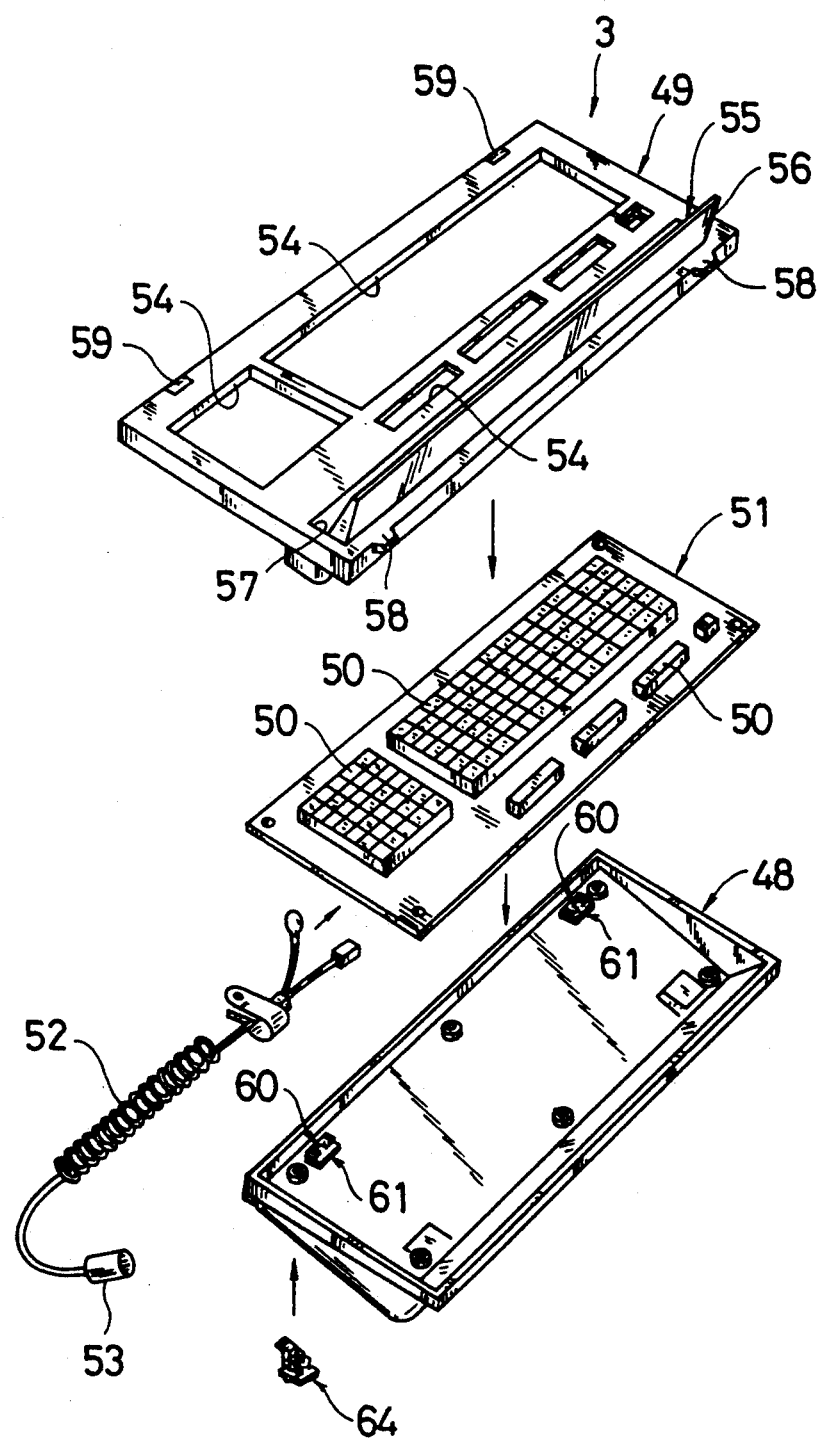

As shown in FIG. 9, the keyboard 3 includes a lower housing 48 as a bottom wall thereof and an upper housing 49 forming the box, a key unit 51 which has a lot of input keys 50 . . . and is provided between the housings 48 and 49 and a key cord 52 for connecting the key unit 51 to the body 1. The key cord 52 has one end thereof directly connected to the key unit 51, and the key unit 51 and the upper housing 49 are screwed to the lower housing 48 so that the keyboard 3 is assembled. The key cord 52 has a connector 53 for connecting the keyboard 3 to the body 1 provided on the other end thereof.

Figure 10:
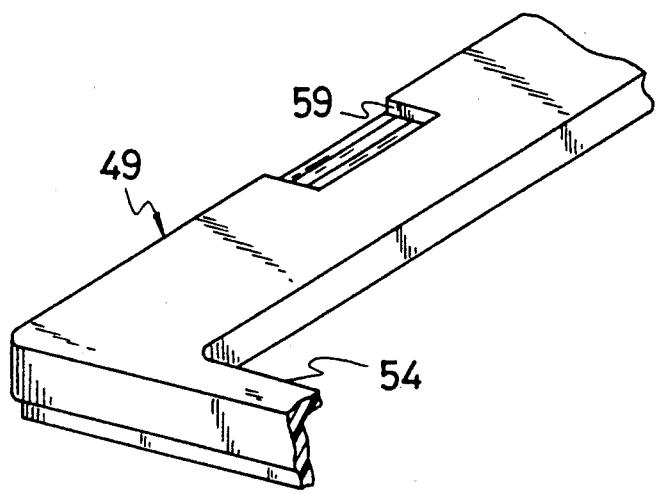

An upper wall of the upper housing 49 has a plurality of openings 54 . . . formed in positions corresponding to the input keys 50 . . . of the key unit 51. A cord housing 55 is formed along side edges opposite to the body 1 with extending from side to side. The cord housing 55 includes an opening and closing lid 56 and a concave 57 for housing a cord. The side edges opposite to the body 1 have projections 58, 58 formed in the vicinity of the right and left ends, i.e., in positions corresponding to the holes 76, 76 of the display front cabinet 39 and protruded in a direction opposite to the body 1. Also as shown in FIG. 10, ports 59, 59 are provided on both sides of an edge portion on an operator's side. Projections 67, 67 of the keyboard locking members 64, 64 to be described below are fixed to the ports 59, 59.

Figure 11:
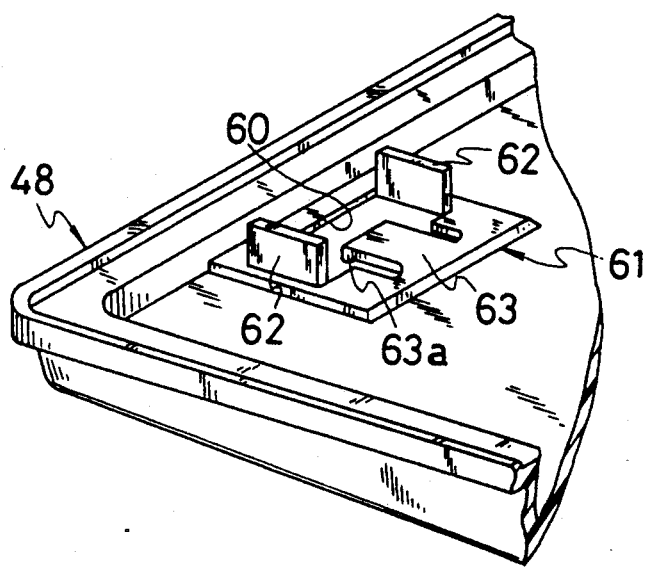

As shown in FIG. 11, the lower housing 48 has openings 60, 60 for mounting the keyboard locking members 64, 64 formed in positions corresponding to the ports 59, 59 of the upper housing 49. Each opening 60 has a receiving member 61 mounted therein. The receiving member 61 has guide erections 62, 62 and a stopper 63. The guide erections 62, 62 are provided on the right and left of the opening 60 and extend back and forth in parallel to each other. The stopper 63 is elastic, extends from the rear of the center of the opening 60 to a central portion and has a projection 63a formed on a tip portion thereof.

Figure 12:
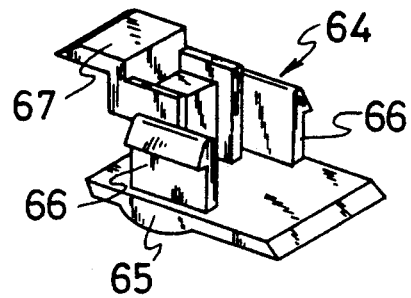
Figure 13:
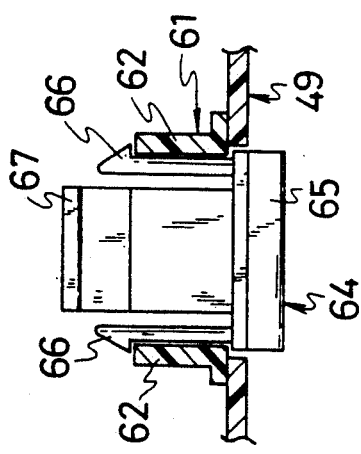

The keyboard locking members 64, 64 as keyboard locking projections are inserted from the bottom surface of the lower housing 48 into the openings 60, 60 so as to be fixed to the openings 60, 60 of the lower housing 48 and the ports 59, 59 of the upper housing 49. As shown in FIG. 12, the keyboard locking member 64 includes an operating portion 65, engagement sliding portions 66, 66 and a projection 67. The operating portion 65 is provided on the bottom surface side of the lower housing 48. The engagement sliding portions 66, 66 are elastic and engaged with upper end faces of the guide erections 62, 62 of the stopper 63. The projection 67 advances from the port 59 of the upper housing 49 so as to be inserted into the hole 75 of the display front cabinet 39 when the keyboard 3 is attached to the display 2. As shown in FIG. 13, the keyboard locking member 64 is mounted on the receiving member 61.

Figure 14B:
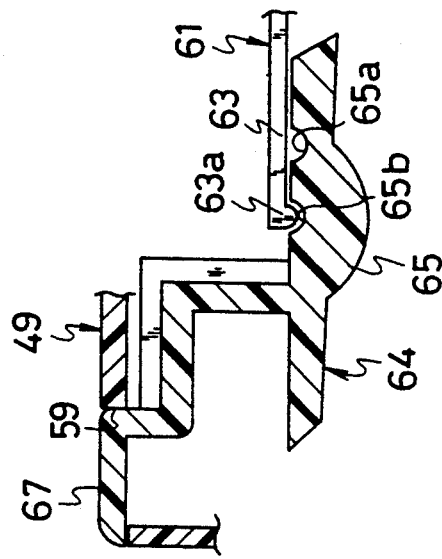
FIG. 14(b) is a longitudinal section view showing a state in which the keyboard locking member retreats.
Figure 14A:
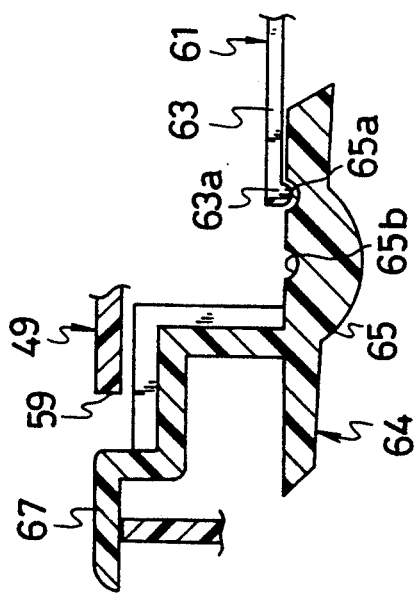
FIG. 14(a) is a longitudinal section view showing a state in which the keyboard locking member advances.

As shown in FIGS. 14 (a) and (b), the operating portion 65 of the keyboard locking member 64 has concaves 65a and 65b formed on an upper surface thereof perpendicularly to advance and retreat directions of the keyboard locking member 64. The concave 65a is engaged with the projection 63a of the stopper 63 in the receiving member 61 when the projection 67 of the keyboard locking member 64 advances from the port 59 of the upper housing 49. The concave 65b is engaged with the projection 63a when the projection 67 retreats. A locking engagement portion is formed by the projection 63a and the concave 65a, while a locking release engagement portion is formed by the projection 63a and the concave 65b.

Figure 15A:
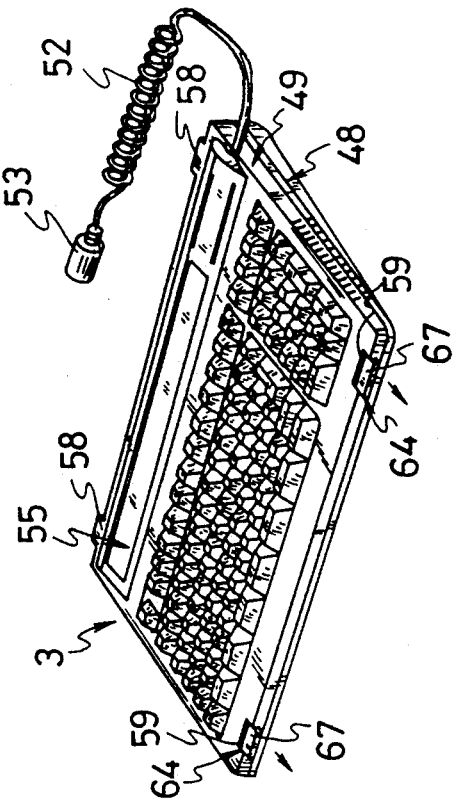
FIG. 15(a) is a perspective view showing the keyboard in a state in which the keyboard locking member does not advance.
Figure 15B:
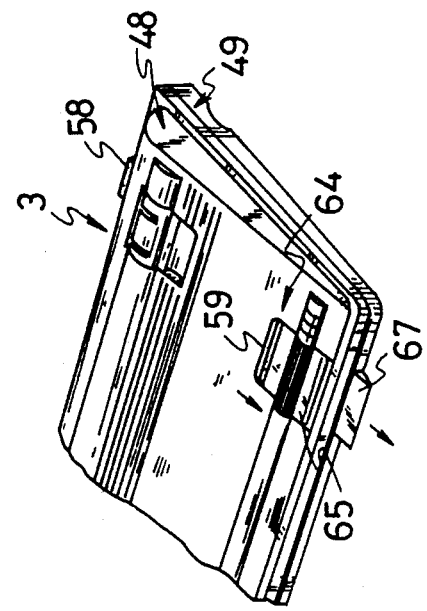
FIG. 15(b) is a perspective view showing a main portion of the back side of the keyboard in a state in which the keyboard locking member does not advance.

In a case in which the computer device having the above construction is carried, the key cord 52 is first removed from the body 1 as shown in FIG. 15 (a). In this case, the tip of the projection 67 of the keyboard locking member 64 does not advance from the port 59 on the upper housing 49 of the keyboard 3 but is on the same level with the upper housing 49 as shown in FIG. 15 (b).

In a state in which the display 2 is rotated to be inclined as shown in FIGS. 1 and 3 (b) or the display 2 is rotated in a direction of the body 1 to be locked to the body 1 by the display locking members 46, 46, the projections 58, 58 are inserted into the holes 76, 76 on the display front cabinet 39 of the display 2 with the surface of the keyboard 3 turned toward the display 2. Then, the keyboard 3 is rotated in a direction of the display 2 around the lower end of the keyboard 3 as a rotary shaft to come into contact with the keyboard contact portions 72, 72 of the display front cabinet 39.

Figure 16A:
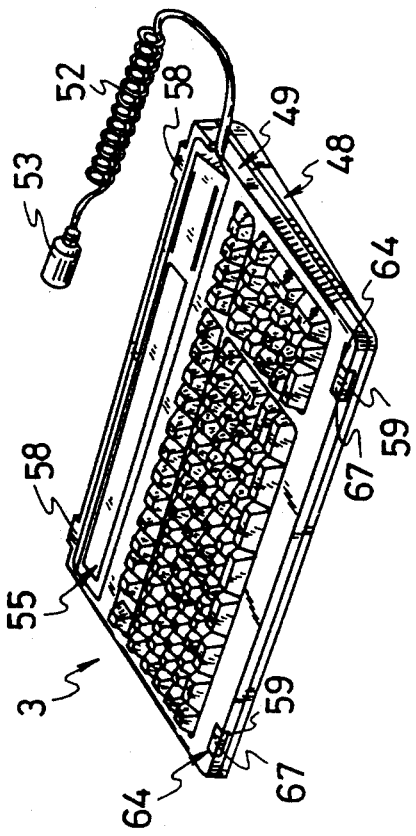
FIG. 16(a) is a perspective view showing the keyboard in a state in which the keyboard locking member advances.
Figure 16B:
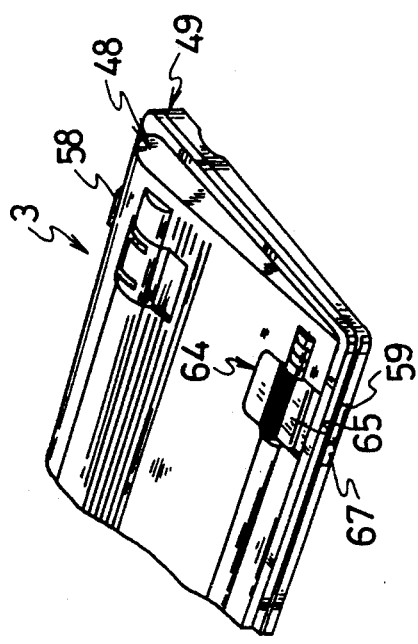
FIG. 16(b) is a perspective view showing a main portion of the back side of the keyboard in a state in which the keyboard locking member advances.

In the above state, when the operating portions 65, 65 of the keyboard locking members 64, 64 are pushed upward, the projections 67, 67 of the keyboard locking members 64, 64 are protruded from the ports 59, 59 of the upper housing 49 as shown in FIGS. 16 (a) and (b). Then, the projections 67, 67 are inserted into the holes 75, 75 of the display front cabinet 39. Consequently, the keyboard 3 is fixed to the display 2. As shown in FIG. 14 (a), the projection 63a on the stopper 63 of the receiving member 61 is engaged with the concave 65a of the keyboard locking member 64. Accordingly, the keyboard locking member 64 is held in a state in which the projection 67 is inserted into the hole 75 of the display front cabinet 39.

Then, if the display 2 is inclined, the display 2 is rotated in the direction of the body 1 so as to be locked to the body 1 by the display locking members 46, 46. Consequently, the computer device of the present invention can be carried.

When the operating portions 65, 65 of the keyboard locking members 64, 64 are pushed downward, the projections 67, 67 of the keyboard locking members 64, 64 retreat into the ports 59, 59 of the upper housing 49 so as to be drawn out of the holes 75, 75 of the display front cabinet 39 as shown in FIGS. 15 (a) and (b). In this case, the projection 63a on the stopper 63 of the receiving member 61 is engaged with the concave 65b of the keyboard locking member 64 as shown in FIG. 14 (b). Accordingly, the keyboard locking member 64 is held in a state in which the projection 67 retreats into the port 59.

In the above state, since the projection 67 of the keyboard locking member 64 blocks the port 59 as shown in FIG. 14 (b), the dust or the like is prevented from entering into the keyboard 3 through the port 59. Then, if an operation reverse to the operation of attaching the keyboard 3 is performed, the keyboard 3 can be removed from the display 2.

In a case in which the computer device is used, the keyboard 3 is first removed from the display 2 as shown in FIG. 1 and then the key cord 52 of the keyboard 3 is connected to the body 1. Thereafter, the display locking members 46, 46 are disengaged from the holes 47, 47 of the locking guide concaves 12, 12 so that the display 2 is rotated upward to have a proper angle of inclination as shown in FIG. 3 (b). Then, when an electric power is turned on, the operation of the computer device is started so that the cooling fans 10, 10 are rotated.

When the cooling fans 10, 10 are rotated, the air in the body 1 is discharged from the vent 8 of the body back cabinet 7 as shown in FIG. 3 (b). Consequently, the hot air produced by the heat generation of the electric power unit and the circuit board in the body 1 is discharged from the body 1 so that the inside of the body 1 is cooled. Furthermore, the air is drawn into the body 1 through the vents 9, 9 of the body front cabinet 6 along with the exhaustion of the cooling fans 10, 10. Consequently, an air flow is generated on the front sides of the vents 9, 9 in a direction of the inside of the body 1. The air flow causes the air in the display 2 to be discharged from the vents 45, 45 of the display back cabinet 40. Consequently, the hot air produced by the heat generation of the display unit 5 in the display 2 is discharged from the display 2 so that the inside of the display 2 is cooled. According to the computer device of the present invention, the inside of the body 1 and display 2 is cooled as described above.

In a case in which the display 2 is locked to the body 1, the air flow is generated as shown in FIG. 3 (a) when the cooling fans 10, 10 are rotated. In other words, the air flows from the display 2 to the outside through the vent 45 of the display back cabinet 40, the tilt vent 20, the vent 9 of the body front cabinet 6, the cooling fan 10 and the vent 8 of the body back cabinet 7. Similarly, the inside of the body 1 and display 2 is cooled.

While the present embodiment has described a construction in which two cooling fans 10, 10 are provided in the body 1, a single cooling fan 10 may perform cooling.

The engagement of the body 1 with the display 2 will be described in detail with reference to FIG. 18.

The display back cabinet 40 surrounding the display locking member 46 has a locking guide projection 68 as an engagement guide projection formed thereon. The locking guide projection 68 covers the back face and both side faces of an engagement portion 69 in the tip portion of the display locking member 46.

As shown in FIG. 18, the display locking member 46 has the engagement portion 69 like a hook and an operating portion 70 which is rotatably connected to the display back cabinet 40. The display locking member 46 has a shape along the contours of the display back cabinet 40 and the locking guide projection 68 from the operating portion 70 to the engagement portion 69.

As shown in FIG. 19, the display locking member 46 has concaves 70a, 70a like cylindrical holes formed on both sides of the rear end thereof, stoppers 70b, 70b protruded on both sides of the back face thereof, a spring receiving cylinder 70c into which a compression spring 81 is inserted formed in the vicinity of the center of the back face thereof and projections 70d, 70d formed on both sides thereof.

As shown in FIG. 20, an opening 82 is formed in a position in which the display locking member 46 is to be provided in the display back cabinet 40. The opening 82 has support members 83, 83 extending in a direction of the back of the display back cabinet 40 formed on upper and lower edges thereof. The support members 83, 83 have cylindrical projections 83a, 83a formed thereon. The projections 83a, 83a are fitted into the concaves 70a, 70a on the operating portion 70 of the display locking member 46. A spring receiving portion 84 is formed from the support members 83, 83 to a position near the center of the display back cabinet 40.

As shown in FIGS. 21 and 22(a), the display locking members 46, 46 are rotatably provided on the display back cabinet 40 with the projections 83a, 83a of the support members 83, 83 fitted into the concaves 70a, 70a of the operating portion 70. Furthermore, the display locking members 46, 46 are energized in a direction of the outside of the display back cabinet 40 by the compression spring 81 which is provided between the spring receiving cylinder 70c of the operating portion 70 and the spring receiving member 84 of the display back cabinet 40. In addition, the stoppers 70b, 70b which come into contact with the support members 83, 83 control the rotation of the display locking members 46, 46 in the direction of the outside of the display back cabinet 40.

In a case in which the computer device having the above construction is carried, the display 2 which is inclined as shown in FIG. 3(b) is first rotated in the direction of the body 1 as shown in FIG. 3(a). Then, the display locking members 46, 46 of the display back cabinet 40 are engaged with the holes 47, 47 of the locking guide concaves 12, 12 in the body front cabinet 6. As shown in FIG. 22(a), in a case in which the locking guide projection 68 of the display back cabinet 40 is fitted into the locking guide concave 12 of the body front cabinet 6 along with the rotation of the display 2, the engagement portion 69 of the display locking member 46 is engaged with the hole 47 of the locking guide concave 12.

Accordingly, the shift of positions of the display locking member 46 and the hole 47 is rarely caused so that they can easily be engaged with each other. In addition, the display locking member 46 is not damaged. In a state in which the display locking member 46 is engaged with the hole 47, the locking guide projection 68 is engaged with the locking guide concave 12. Therefore, since the locking guide projection 68 and the locking guide concave 12 can get the external shock, the engagement portion 69 of the display locking member 46 which has a weak construction is rarely damaged. Furthermore, the display 2 can be prevented from being vibrated.

Figure 23:
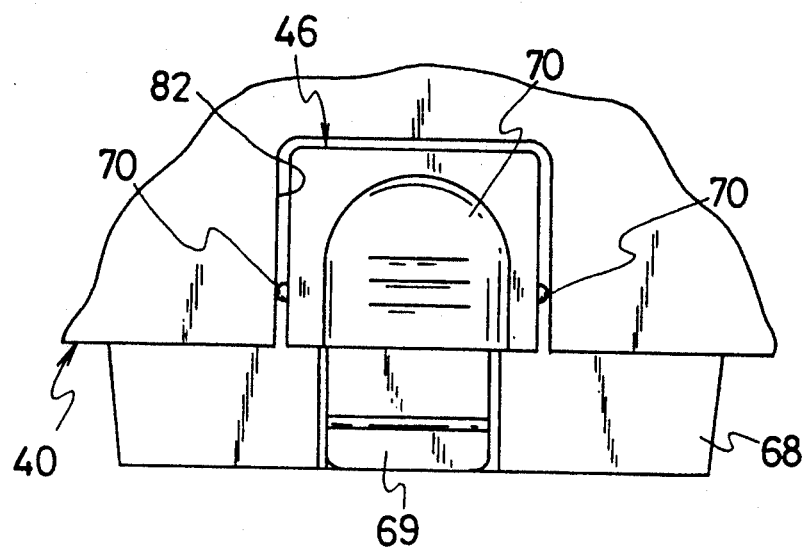
FIG. 23 is a front view showing the display locking member mounted on the display back cabinet.

In a case in which the engagement portion 69 of the display locking member 46 is engaged with the hole 47 of the locking guide concave 12, the engagement portion 69 first comes into contact with a wall of the locking guide concave 12. Then, the display locking member 46 is rotated in a direction of A around the concaves 70a, 70a so as to be engaged with the hole 47 as shown in FIG. 22(b). In this case, projections 70d, 70d formed on the operating portion 70 of the display locking member 46 slidably come into contact with a wall of the display back cabinet 40 as shown in FIG. 23. Therefore, the display locking member 46 can stably be rotated without causing the shift of positions of the engagement portion 69 and the hole 47. Consequently, the operation of engaging the display locking member 46 with the hole 47 and the disengagement operation to be described below can be performed more surely.

As shown in FIG. 2, if the keyboard 3 is attached to the display 2, the computer device of the present invention can be carried.

In a case in which the computer device is used, the keyboard 3 is first removed from the display 2 so as to be arranged face up and then the key cord 52 of the keyboard 3 is connected to the body 1.

Thereafter, the both display locking members 46, 46 are simultaneously pressed toward the inside thereof. Consequently, the display locking members 46, 46 are rotated in the direction of A around the concaves 70a, 70a so that the engagement portion 69 is disengaged from the hole 47 as shown in FIG. 22(b). Since the display locking members 46, 46 are independently operated, one of them is held engaged even if the other is operated. Therefore, the display 2 can be prevented from being rotated carelessly. Then, the display 2 is rotated upward to have a desired angle of inclination while continuing the operation of pressing the display locking members 46, 46 until the engagement portion 69 is disengaged from the hole 47. Thereafter, a power switch is turned on so that the computer device can be used.

While the display locking member 46 as a projected engagement portion and the locking guide projection 68 as an engagement guide projection, and the hole 47 as a concave engagement portion and the locking guide concave 12 as an engagement guide concave are respectively provided in the same positions in the present embodiment, they may respectively be provided in other positions.

Figure 24:
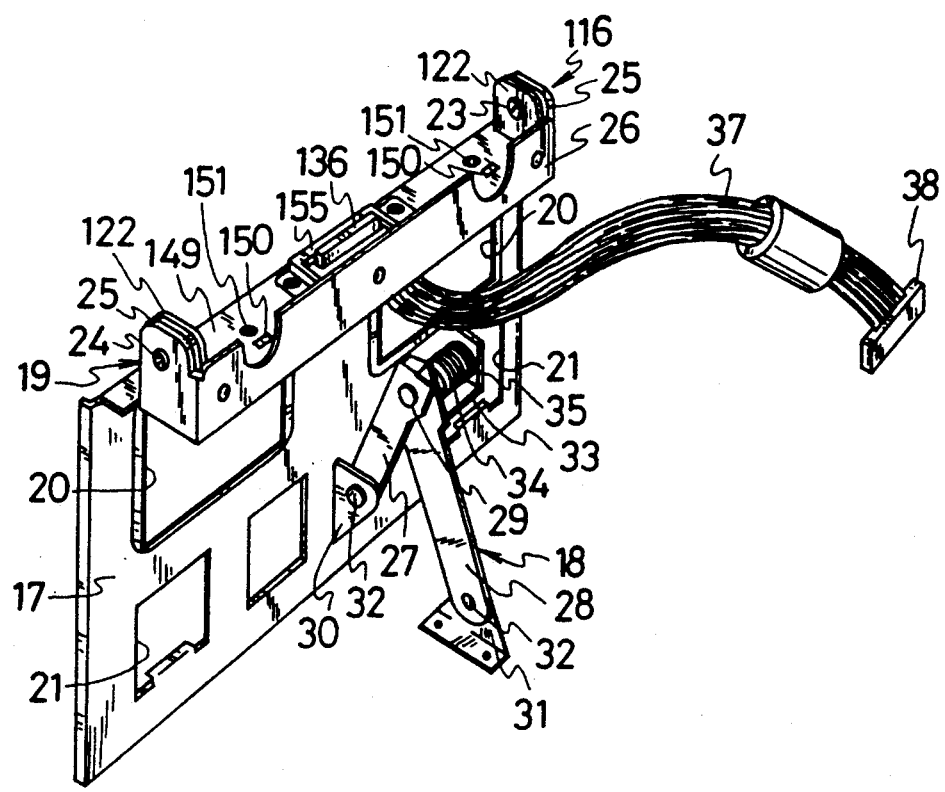

There will be described a variant of the tilt unit 16 with reference to FIG. 24.

A display receiving plate 17 of a tilt unit 116 has a lateral member 149 formed on a top thereof. The lateral member 149 is bent in approximately perpendicular to a lower portion of the display receiving plate 17. In addition, the lateral member 149 has hinge rotary portions 122, 122 which are protruded upward formed on both ends thereof.

As shown in FIG. 25, the lateral member 149 has a pair of hole 150 and screw hole 151 formed on the right and left thereof. In addition, the lateral member 149 has a female connector 136 formed in the center thereof. As shown in FIG. 26, the female connector 136 has a connector portion 152 and a flange portion 153 which is provided on the outer periphery of the connector portion 152. The flange portion 153 is provided on the lateral member 149, and the connector portion 152 is fitted into a hole 154 which is formed on the lateral member 149.

The flange portion 153 has a connector holding members 155 mounted thereon by means of screws 156, 156. The connector holding member 155 has a lower flat portion 155a, an upper flat portion 155b and an erection 155c. The lower flat portion 155a comes into contact with the lateral member 149. The upper flat portion 155b has a through hole 155d formed in the center thereof. The through hole 155d is protruded upward from the lower flat portion 155a along the contour of the flange portion 153 of the female connector 136 and penetrated by the connector portion 152. The erection 155c is provided between the lower and upper flat portions 155a and 155b. The dimension of the erection 155c is set such that the female connector 136 can be slided between the upper flat portion 155b and the lateral member 149. In other words, a proper gap d1 is formed between the upper flat portion 155b and the flange portion 153. Furthermore, a gap d2 is formed between the lateral member 149 and the connector portion 152 in the hole 154 of the lateral member 149 and between the erection 155c of the connector holding member 155 and the flange portion 153. In the present embodiment, the gap d2 is 1 mm. Consequently, even if the positions of the female connector 136 and the male connector 41 are more or less shifted, they can surely be fitted to each other.

The stays 27 and 28 have a damper unit 33 as an inclination support unit provided in a connecting portion thereof. As shown in FIG. 27, the damper unit 33 includes a movable shaft 157, a rigid shaft 158, a shaft lock spring 34, an E ring 159, a flat washer 160, a screw 161 with a flat washer, a spacer 162 and a bracket 35. The rigid shaft 158 is provided on the outer periphery in one end of the movable shaft 157. The shaft lock spring 34 is provided on the outer periphery of the movable shaft 157 and the rigid shaft 158. The E ring 159 is provided on an end face of the rigid shaft 158. The flat washer 160 is provided outside the E ring 159. The screw 161 with a flat washer fixes the stay 27 to the movable shaft 157. The spacer 162 is provided between the stays 27 and 28. The bracket 35 connects the stay 28 to the rigid shaft 158. The shaft lock spring 34 has one end thereof connected to the rigid shaft 158 and the other end thereof connected to the movable shaft 157. Consequently, the display receiving plate 17, i.e., the display 2 can hold an optional angle of inclination when rotated.

The male connector 41 has coupling members 42, 42 like protruded pieces formed on both sides thereof. As shown in FIG. 25, the coupling member 42 has a screw hole 42a and a click 42b which is protruded downward. The coupling member 42 is coupled to the lateral member 149 by a screw 163 with the click 42b fitted into a hole 150 on the lateral member 149 of the display receiving plate 17.

In a case in which the computer device having the above construction is assembled, the operation of attaching the display 2 is performed as described below.

First, the tilt unit 116 is attached to the body 1. Then, the clicks 43, 43 which are provided on the back of the display 2 are arranged on the undersides of the display support openings 21, 21 on the display receiving plate 17 of the tilt unit 116. In addition, the click 42b of the coupling member 42 is fitted into the hole 150 on the lateral member 149 of the display receiving plate 17. At the same time, the male connector 41 of the display 2 is fitted into the female connector 136 on the lateral member 149 of the display receiving plate 17. As described above, the female connector 136 can be slided more or less between the connector holding member 155 and the lateral member 149. Consequently, even if the positions of the connectors 41 and 136 are slightly shifted from each other, the male connector 41 can easily be fitted into the female connector 136.

Then, the coupling members 42, 42 are coupled to the lateral member 149 by means of the screws 163, 163 so that the display 2 is attached to the body 1. If an operation reverse to the above operation is performed, the display 2 can easily be removed from the body 1.

According to the computer device of the present invention, the external operation causes the display 2 to be attached to or removed from the body 1 easily.

In a case in which the display 2 attached to the body 1 through the tilt unit 116 is manually rotated to have a predetermined angle of inclination, the display 2 is rotated around a top portion thereof by the hinge portion 19. When the operation of applying force in a rotary direction is stopped, the damper unit 33 of the rotary support unit 18 causes the display 2 to be stopped to have the predetermined angle of inclination. Since the damper unit 33 supports the display 2 in a portion lower than the center of rotation of the display 2, the damper unit 33 need not support the inclined display 2 with great force. Accordingly, it is not required to rotate the display 2 with the great force. Consequently, there is no possibility that the great rotary force causes the computer device to be upset. Therefore, the display 2 can smoothly be rotated.

According to the computer device of the present invention, when the display 2 is rotated in the direction of the body 1, the stays 27 and 28 of the rotary support unit 18 are rotated between the display receiving plate 17 and the body 1 so that the angle formed by the stays 27 and 28 is gradually reduced. Accordingly, in a case in which the display 2 is rotated in the direction of the body 1 so as to be erected, the longitudinal width of the tilt unit 116 can be reduced. Consequently, the device can be minimized.

Figure 28:
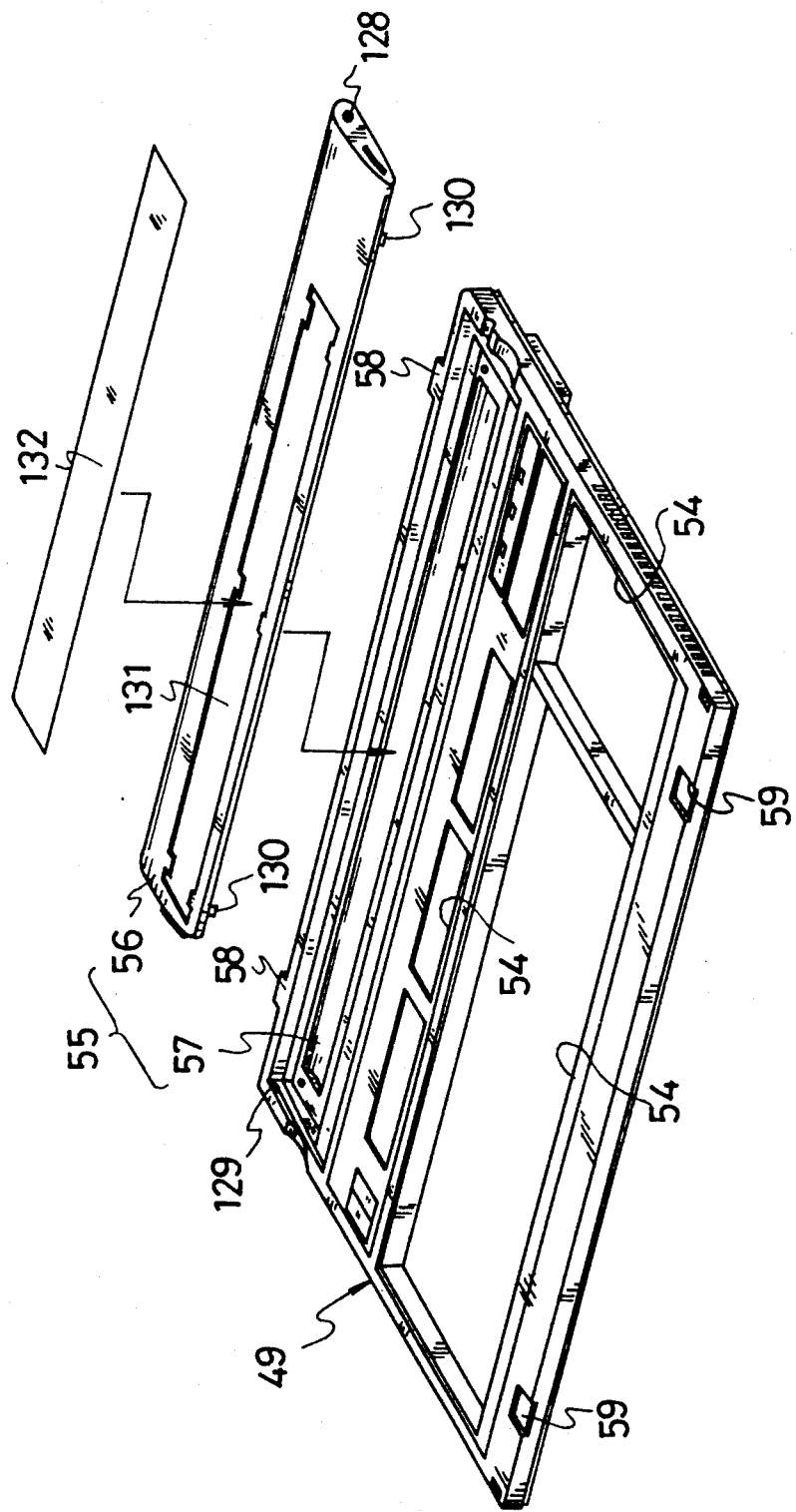

There will be described the cord housing 55 with reference to FIG. 28.

The cord housing 55 includes a concave 57 for housing the key cord 52 and an opening and closing lid 56. The concave 57 is formed from side to side along a side edge opposite to the body 1. The opening and closing lid 56 covers the concave 57 so as to be opened and closed freely. There is a sufficient space in the keyboard 3 to form the concave 57. Therefore, the cord housing concave 57 has a size enough to house the key cord 52 therein.

Shafts 128, 128 are fitted into concaves 129, 129 so that the opening and closing lid 56 is attached to the upper housing 49 so as to be opened and closed freely. The shafts 128, 128 are formed right and left on both end faces of the opening and closing lid 56. The concaves 129, 129 are formed in the vicinity of both ends of the concave 57. The opening and closing lid 56 has lock clicks 130, 130 formed in a side edge on the opening and closing side thereof. The opening and closing lid 56 is fixed by the lock clicks 130, 130 with being closed. The opening and closing lid 56 has a concave 131 formed on the top surface thereof. The concave 131 has a function seat 132 fitted therein.

With the above construction, in a case in which the computer device is carried, the key cord 52 is first removed from the body 1. Then, the opening and closing lid 56 of the cord housing 55 is opened so that the key cord 52 is housed in the concave 57, and thereafter the opening and closing lid 56 is closed.

According to a series of operations described above, it is sufficient that the connector 53 of the key cord 52 is removed from the body 1. In addition, since the concave 57 of the cord housing 55 is fully large-sized, the operations can easily be performed. Also in a case in which the key cord 52 is taken out of the cord housing 55 so as to be connected to the body 1, operations reverse to the above operations can easily be performed. The key cord 52 has one end thereof directly connected to the key unit 51. Consequently, there is no possibility that the key cord 52 is lost. In addition, in a case in which the keyboard 3 is used, the key cord 52 is always attached to the keyboard 3.

What is claimed is:

1. A computer device with a display comprising:
a body;
a display rotatably mounted on the body; and
a keyboard having input keys and removably mounted on the display so as to cover a display opening when the keyboard is rotated toward the display,
the keyboard having a projection for attaching the keyboard to an edge of the display and a keyboard locking projection which can advance from and retreat beneath an edge surface of the keyboard,
the display having a lower keyboard receiving face provided below the display opening to receive a lower edge surface of the keyboard, an upper keyboard receiving face provided above the display opening to receive an upper edge surface of the keyboard,
the lower keyboard receiving face having a hole into which the keyboard projection can be inserted to allow rotation of the keyboard about the attaching projection and the upper keyboard receiving face having a hole which can be engaged by the keyboard locking projection, and
an opening in the back side of the keyboard into which the keyboard locking projection can be inserted, and
a port through which the keyboard locking projection may advance,
the opening including:
a guide which extends in advance and retreat direction of the keyboard locking projection, and
an elastic stopping member which presses an operation portion of the keyboard locking projection towards the back face of the keyboard,
wherein operation of the keyboard locking projection causes the locking projection to advance from and retreat into the surface of the keyboard through the keyboard port;
wherein an elastic engagement sliding portion slidably engages with a top end face of the guide and the keyboard locking projection is removed by moving it towards the bottom of the keyboard;
the stopping member and the keyboard locking projection having a locking engagement portion which is engaged with the keyboard locking projection at the time of advance and a locking release engagement portion which is engaged with the keyboard locking projection at the time of retreat.

2. A computer device with a display according to claim 1 wherein the back side of the display further includes at least one vent, the body further includes at least one vent formed on the front and back sides thereof respectively in approximate alignment with the vent on the display and wherein the body includes at least one cooling fan for directing air towards a back side body vent thereby simultaneously cooling internal cavities in both the body and display.

3. A computer device with a display according to claim 1 wherein one of the display and the body includes a projection and on the other includes a concave, the projection being engaged with the concave to permit controlled rotation of the display, and
wherein one of the display and the body includes a guide projection and the other includes a guide concave for engaging the guide projection.

4. A computer device with a display according to claim 1 wherein the body includes a tilt unit for rotatably supporting the display on an upper body portion formed on a front body face,
the tilt unit including:
a display receiving member removably attached to the display,
a hinge portion attached to an upper end of the display receiving member for rotatably connecting the display receiving member to the body,
and a rotary support unit provided between the body and the display receiving member for holding the display at an optional angle of inclination about the hinge portion.

5. A computer device with a display according to claim 4 wherein the rotary support unit includes two stays and an inclination support unit,
the ends of the two stays being rotatably connected to each other, the other end of one of the stays being rotatably connected to the display receiving member and the other end of the other stay being rotatably connected to the body, and
the inclination support unit being attached to both stays at the rotatable connection to hold the display at an optional angle of inclination when the display is rotated.

6. A computer device with a display according to claim 1 further comprising:
a key cord having one end connected to the keyboard and the other end connected to the body, and the keyboard includes a cord housing for housing the key cord.

* * * * *